United States Patent

[11] 3,568,674

| [72] | Inventor | Harold C. Palmer<br>Rte. 4, King Drive, Douglasville, Ga. 30134 |
|---|---|---|
| [21] | Appl. No. | 726,528 |
| [22] | Filed | May 3, 1968 |
| [45] | Patented | Mar. 9, 1971<br>Continuation-in-part of application Ser. No. 388,911, Aug. 11, 1964, abandoned. |

[54] METHOD OF DEFENSE AGAINST ATTACK
8 Claims, No Drawings

[52] U.S. Cl. ................................................... 128/215,
128/1, 128/Projectile Digest
[51] Int. Cl. .......................................................... A61m 5/00
[50] Field of Search............................................ 128/215,
218, (Projectile Digest); 167/46 (A), 58.1, 65 (i),
(Inquired); 273/106.5; 424/266

[56] References Cited
UNITED STATES PATENTS

| 2,923,243 | 2/1960 | Crockford et al. | 102/92 |
| 2,995,373 | 8/1961 | Cox | 273/106.5 |
| 3,006,649 | 10/1961 | Gesick et al. | 273/106.5 |
| 3,042,406 | 7/1962 | Gregory | 273/106.5 |

OTHER REFERENCES

United States Dispensatory, 21st ED., 1926, Phila. & London J.B. Lippincott Co., pp 1509— 10.

Hayes et al. (I), Observations on the use of Nicotine for immobilizing Semiwild Goats, Journal of the American Veterinary Medical Society, Vol. 130, June 1, 1957, pp. 479— 82.

Hayes et al. (II), Porpulsive Administration of Nicotine as a new approach to capturing and restraining cattle, Journal of the American Veterinary Medical Society, Vol. 134, No. 6, March 15, 1959, pp.283— 286.

*Primary Examiner*—Charles F. Rosenbaum
*Attorney*—Newton, Hopkins and Ormsby

ABSTRACT: A method of defense for use by a human defender against attack by an assailant comprising the steps of puncturing the skin of the assailant, and injecting a sublethal dose of an initially liquid chemical pain producing substance into the body of the assailant so as to cause him to break off the attack. The pain producing substance is the type that will become ineffective within the body of the assailant after a discreet period of time without causing any permanent ill effects to the assailant.

METHOD OF DEFENSE AGAINST ATTACK

CROSS-REFERENCE TO RELATED APPLICATION

This application is a continuation-in-part of my copending application Ser. No. 388,911, filed Aug. 11, 1964, for "-Method of Defense Against Attack," now abandoned.

This invention relates to a method of defense against attack which is particularly applicable against human assailants such as muggers, purse snatchers, rioters and the like.

In utilization of the method of this invention the object is not to kill the assailant but merely to causes him to break off the attack. The types of attack against which this invention is directed involve situations where property is imperiled or where the object of the attack is less than an attempt to kill. The types of attack set forth hereinabove fall into this category.

The instant invention comprises puncturing the skin of the assailant and injecting an irritating liquid into the body of the assailant. The irritating liquid is injected in a sublethal dose in sufficient dosage to cause a good deal of pain for a time sufficient to cause the assailant to break off the attack and permit the attacked party to summon help. The invention has the further advantage that subsequent to the use of the device the assailant is not seriously injured and after the passage of the time interval involved will suffer no ill effects from the utilization of this invention upon him. On the other hand the extreme pain produced after the utilization of this device will cause the assailant to have long and hard second thoughts about carrying out such an attack a second time.

In brief the invention comprises the novel step of injecting (preferably subcutaneously) an irritating liquid, preferably of nontoxic nature, into the body of the assailant.

The above constitutes a brief description of the invention and the objects and advantages thereof. A detailed description of the instant invention will now be given.

The method of this invention is preferably carried out by the utilization of an injecting member which contains the irritating liquid. An injecting member which can be utilized in connection with this invention is set forth in U.S. Pat. No. 2,923,243.

This projectile may preferably be modified by closing the front of the hollow member and providing a plurality of laterally disposed openings through the needle member adjacent the closed front portion so as to provide subcutaneous injection of the irritating liquid as will be subsequently described.

the projectile is preferably propelled by a gun actuated by compressed air or by gun powder as disclosed in U.S. Pat. No. 2,923,243. The irritating liquid may be any liquid suitable for the purpose. As examples, mention is made of methyl salicylate (Oil of Wintergreen), acetic acid, hypertonic salt solution and the like. The quantity of liquid used depends on the particular irritating liquid used. Generally, the quantity of liquid employed ranges from .1cc. to 3cc.

EXAMPLE I

An injection device having a container with automatic pressure injection means operatively connected thereto (somewhat similar to that disclosed in the previously mentioned U.S. Pat.) was obtained. The needle member of this invention also had a closed front end and a plurality of adjacent lateral openings therethrough. The container member of the injection device was filled with 3cc. of methyl salicylate. The device was fired into an assailant by the person attacked at a distance of approximately 4 feet. The needle means of the injection device penetrated the leg of the assailant and the automatic pressure injection means caused the 3cc. of methyl salicylate to be propelled into the body of the assailant. The peculiar type of needle means employed caused the injection to be subcutaneous rather than intramuscular.

The assailant then experienced extreme pain and violently gyrated for a period of approximately 30 minutes. After this period of time elapsed the assailant was quite tractable.

The foregoing specification sets forth specific embodiments of this invention, however, the full use of modifications, substitutions, and equivalents may be utilized without departing from the scope of the invention as set forth in the appended claims.

I claim:

1. A method of defense for use by a human defender against attack by a human assailant comprising the steps of:
   a. Puncturing the skin of the assailant; and
   b. Injecting a human sublethal dose of an initially liquid pain producing substance into the body of the assailant to render sufficient pain to the assailant to require him to break off the attack, said pain producing substance becoming ineffective within the body of the assailant after a discrete interval of time without causing any permanent ill effects to the assailant.

2. A method of defense as set forth in claim 1 wherein said pain producing substance is a chemical substance.

3. A method of defense as set forth in claim 2 wherein said substance is subcutaneously injected into the body of the assailant.

4. A method of defense as set forth in claim 2 wherein said step of injecting said substance is performed simultaneously with said step of puncturing said skin.

5. A method of defense as set forth in claim 3 wherein .1cc. to 3cc. of said pain producing substance is injected into the assailant.

6. A method of defense as set forth in claim 5 wherein said pain producing substance is selected from the class consisting of methyl salicylate, acetic acid, vinegar and hypertonic salt solution.

7. A method of defense against human attack comprising puncturing the skin of the attacker and subcutaneously injecting from 1cc. to 3cc. of an initially liquid pain-producing substance into the body of said attacker so as to cause sufficient pain to the attacker to require him to break off the attack, and wherein said pain producing substance will become ineffective within the attacker's body after a discrete interval of time without causing any permanent ill effects to said attacker.

8. A method of defense against human attack comprising puncturing the skin of the attacker and subcutaneously injecting from 1cc. to 3cc. of a liquid chemical pain-producing substance selected from the class consisting of methyl salicylate, acetic acid, vinegar and hypertonic salt solution into the body of said attacker so as to cause sufficient pain to the attacker to require him to break off the attack.